United States Patent [19]

Friedman

[11] 3,989,384
[45] Nov. 2, 1976

[54] SYSTEM FOR MEASURING SMALL ANGULAR MOTIONS

[75] Inventor: Eugene M. Friedman, Landing, N.J.

[73] Assignee: The United States of America as represented by the Secretary of the Army, Washington, D.C.

[22] Filed: May 30, 1975

[21] Appl. No.: 582,501

[52] U.S. Cl. ............................ 356/152; 73/167; 89/41 L; 356/147
[51] Int. Cl.² .................................... G01B 11/26
[58] Field of Search ................ 73/167; 33/286; 89/41 L, 41 E; 356/152, 153, 147

[56] References Cited
UNITED STATES PATENTS

| | | | |
|---|---|---|---|
| 2,489,220 | 11/1949 | Herbold | 356/1 |
| 2,581,355 | 1/1952 | Brown | 89/41 E |
| 2,977,858 | 4/1961 | Jasse | 89/41 E |
| 3,684,383 | 8/1972 | Johansson | 33/286 |
| 3,796,497 | 3/1974 | Mathisen et al. | 356/152 |
| 3,813,171 | 5/1974 | Teach et al. | 356/152 |
| 3,865,483 | 2/1975 | Wojcik | 356/152 |

*Primary Examiner*—Maynard R. Wilbur
*Assistant Examiner*—S. C. Buczinski
*Attorney, Agent, or Firm*—Nathan Edelberg; A. Victor Erkkila; Thomas R. Webb

[57] ABSTRACT

The angle measuring system comprises: a first mirror rigidly attached to the muzzle end of a long gun barrel in a plane normal to the bore axis; second and third mirrors mounted on the gun mount near each other at the rear end of the barrel facing outwardly at 45° to the bore axis; and a collimated light source positioned to project a primary light ray onto the second mirror at a 45° angle to be reflected to the first mirror and then reflected back to the third mirror. A set of mirrors is mounted in the path of the ray reflected from the third mirror, to split the primary ray into two separate substantially-parallel component rays having vertical components of transverse motion corresponding respectively to the vertical and horizontal components of angular motion of the gun muzzle and first mirror. An 8-sided mirror is mounted in the paths of the two components rays to spin at a constant speed about a vertical axis for scanning each component ray across a sensor including a V-shaped photosensitive element. A recording device electrically connected to each sensor calculates and records the time of scan of each component ray across the "V" as a measure of the vertical motion of the component ray; and hence, of the angular motion of the gun muzzle.

10 Claims, 5 Drawing Figures

3,989,384

SYSTEM FOR MEASURING SMALL ANGULAR MOTIONS

GOVERNMENTAL INTEREST

The invention described herein may be manufactured, used and licensed by or for the Government for governmental purposes without the payment to me of any royalty thereon.

BACKGROUND AND SUMMARY OF THE INVENTION

The present invention relates to improved means for measuring and recording small angular motions of an object, such as the muzzle end of a long-barrel artillery piece or gun during firing. One of the problems associated with such measurement in the case of gun barrels is that of preventing the recoil movement of the gun barrel from introducing an error into the measurement. Another problem is to resolve the angular motion into two components, such as horizontal and vertical, and separately measure these two components accurately.

In accordance with the present invention: a first mirror is rigidly mounted on the gun muzzle, or other movable object, in a predetermined plane; a collimated primary light ray is projected onto the mirror in a direction nearly perpendicular to the mirror plane, whereby the ray is reflected back along a path close to the primary ray, with horizontal and vertical components of motion produced by the angular motion of the object; the reflected ray is split by optical means into two spaced substantially-parallel component rays having transverse components of motion in two spaced substantially-parallel planes, for example, vertical planes; the two component rays are reflected by another mirror in directions transverse to the two parallel planes, for example, horizontally; and the transverse components of motion are measured by a photosensitive sensor in the path of each reflected component ray.

The reflected primary ray is preferably reflected by about 90° by a third mirror positioned near the source of the primary ray. The ray-splitting optical means may be a group of three mirrors, one of which is half-reflecting and positioned at a 45° angle to the reflected primary ray to permit part of the ray to pass through as a first component ray and to reflect part of the ray at 90° thereto as a second component ray, the second is positioned to reflect the second component ray in a direction normal to the plane of transverse motion of the reflected primary ray, and the third is positioned to again reflect the second component ray in a direction parallel to the reflected primary ray.

Preferably, the mirror that reflects the component rays to the photosensitive sensors is a plural-sided mirror which rotates about an axis parallel to the direction of transverse motion of the two component rays at a relatively high speed, and each sensor comprises a V-shaped photosensitive element which is scanned by one of the reflected component rays.

DETAILED DESCRIPTION OF A PREFERRED EMBODIMENT

Figure 1:
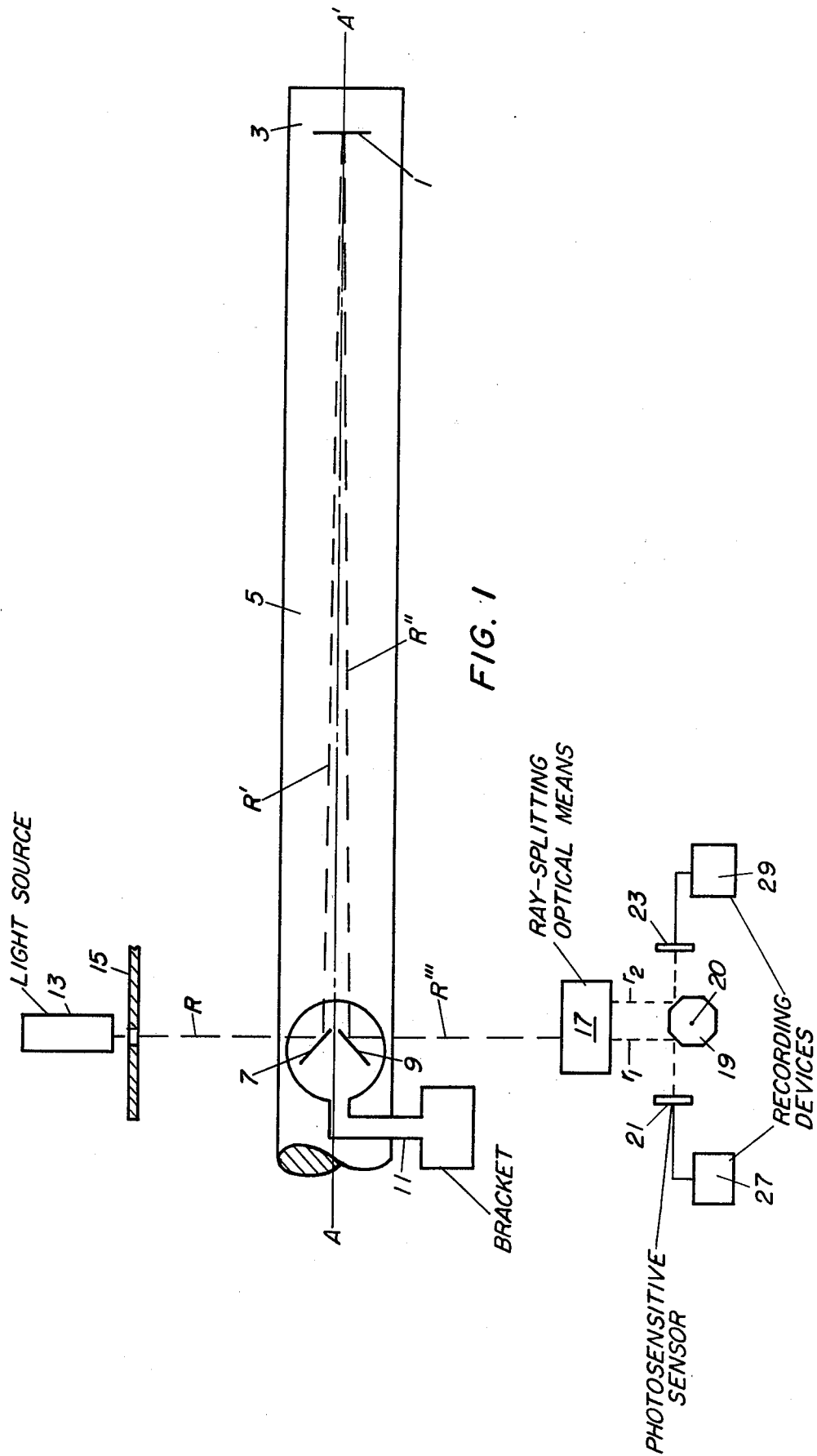
FIG. 1 is a schematic plan view of a system or apparatus for measuring the angular motion of the muzzle end of a gun barrel in accordance with the present invention.
Figure 2:
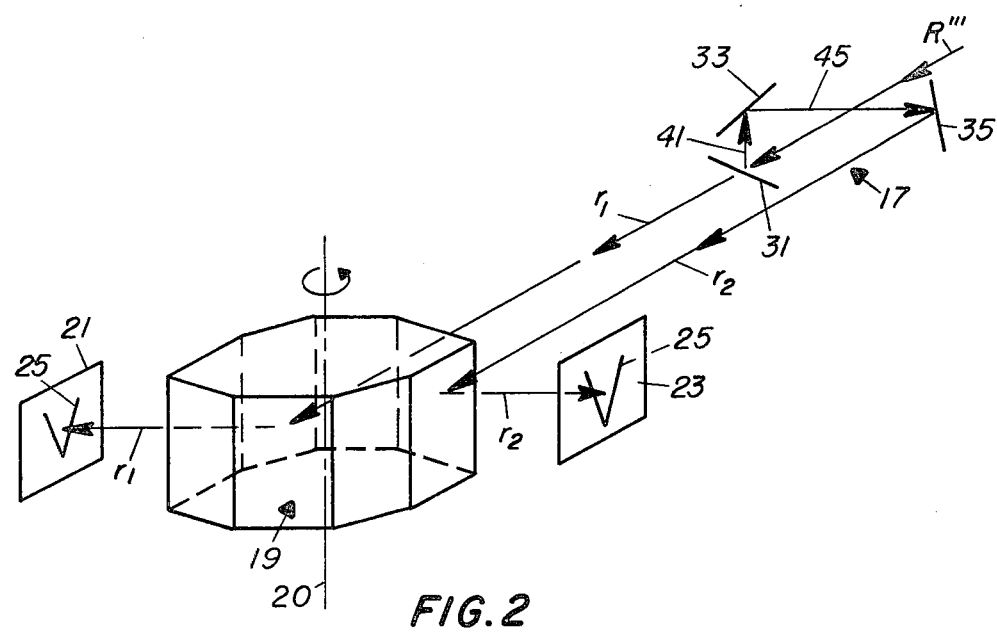
FIG. 2 is a schematic vew of a part of the system of FIG. 1, showing the final reflecting and measuring means in more detail.

FIG. 1-3 illustrate the invention as embodied, for example, in a system or apparatus for measuring and recording the instantaneous angular motion of the muzzle end of a long gun barrel, e.g., a 50-foot artillery gun barrel which recoils several feet during firing. A first mirror 1 is rigidly mounted on the upper surface of the muzzle end 3 of a gun barrel 5 in a plane substantially perpendicular to the longitudinal axis A—A' of the barrel. A second mirror 7 and third mirror 9 are rigidly mounted, by means of a suitable bracket 11 attached to the fixed portion of the gun recoil mount (not shown), above the barrel 5 and center line A—A', close together and oriented at approximately 45° to the axis on opposite sides thereof, as shown in FIG. 1.

A primary light ray R is projected, by a light source 13 and one or more collimating apertured discs 15, onto the second mirror 7 at an angle thereto such as to be reflected as ray R' by mirror 7 to the center of mirror 1. This reflected ray R' is again reflected as ray R'' by mirror 1 along a path nearly parallel (for a long barrel) with the incident path, as shown, to the third mirror 9 where it is again reflected as ray R''', substantially at a right angle, toward a ray-splitting optical means 17, shown in detail in FIGS. 2 and 3 (a, b and c).

Any angular motion of the mirror 1, due to angular motion of the gun muzzle 3, can be resolved into two perpendicular components, e.g., horizontal and vertical, of transverse motion of the reflected ray R''' approaching optical means 17. Rotation of mirror 1 about a vertical axis (perpendicular to the plane of FIG. 1) produces a horizontal motion or shift of the reflected ray R''' (in the plane of FIG. 1); and rotation about an axis in a horizontal plane produces a vertical motion of the reflected ray R''' (normal to the plane of FIG. 1). Optical means 17 (which will be described below) splits or converts the reflected ray R''' into two substantially-parallel component rays $r_1$ and $r_2$, of which $r_1$ has the same vertical component of motion as the vertical component of the reflected ray R''', and $r_2$ has a vertical component corresponding to the horizontal component of ray R'''. In order to measure these two vertical components, a plural-sided (e.g., eight-sided) mirror 19 is mounted in the paths of the component rays $r_1$ and $r_2$ to spin about a vertical axis 20 midway between the two component rays. In the instantaneous position shown in FIGS. 1 and 2, rays $r_1$ and $r_2$ are reflected outwardly by mirror 19 toward photosensitive sensors 21 and 23, respectively. As the mirror 19 rotates, the component rays $r_1$ and $r_2$ are scanned across the sensors 21 and 23, respectively, in the same direction as the direction of the spin. In the example shown in FIG. 2, each sensor comprises a photosensitive element 25, e.g., photo-voltaic, in the shape of a "V". The sensors 21 and 23 are connected to devices 27 and 29 each of which records the electrical outputs of the sensor 21 or 23 as the scanning ray component $r_1$ or $r_2$ impinges on the two sides of the "V", and also calculates and records the time intervals therebetween.

In operation, prior to firing the gun, the muzzle 3 and mirror 1 are stationary, and hence, both component rays $r_1$ and $r_2$ have zero vertical components, and the component rays $r_1$ and $r_2$ scan the V's on the sensors 21 and 23 at the same height, with the same time interval between sides. When the angular position of the gun barrel is changed, as during firing of the gun, this angular motion is measured by variations in the time intervals of scan across the V's of the sensors 21 and 23, in response to the horizontal and vertical components of motion of the reflected ray $R'''$ and the resulting vertical components of motion of the two component rays $r_1$ and $r_2$. A vertical movement of reflected ray $R'''$ and component ray $r_1$ changes the time of scan of the V of sensor 21. On the other hand, a horizontal movement of primary ray $R'''$ in FIG. 2 produces a vertical movement of component ray $r_2$, which changes the time of scan of the V of sensor 23.

Figures 3A, 3B:
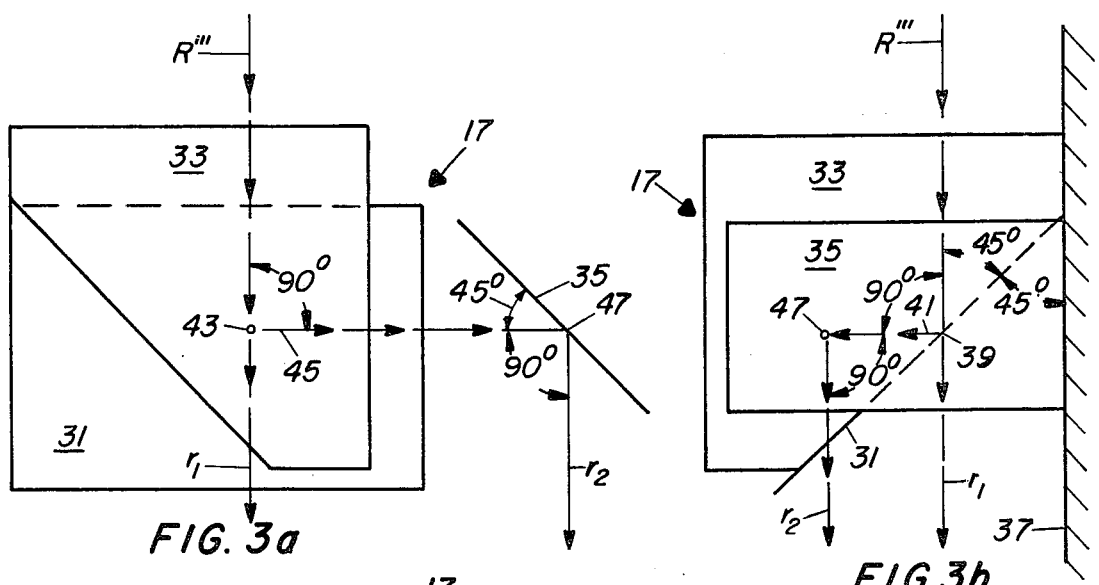
FIGS. 3a, 3b and 3c are top plan, front and side views, respectively, of the intermediate ray-splitting optical system of FIG. 1.
Figure 3C:
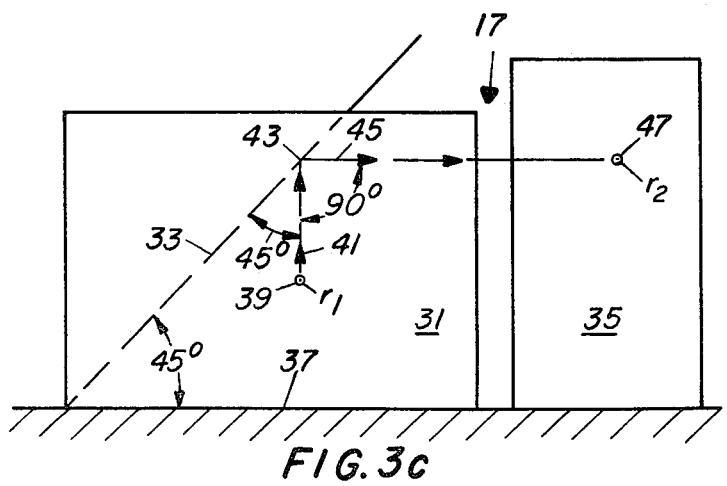

The details of the optical means 17 are shown in FIGS. 2 and 3. This means comprises a group of three mirrors 31, 33 and 35 mounted on a support surface 37. As shown best in FIG. 3b, mirror 31 is positioned in a plane inclined at 45° with respect to the incoming reflected ray $R'''$, to reflect at least a part of ray $R'''$ upwardly from point 39, shown by arrow 41. Mirror 31 is made partly reflecting, preferably 50%, in order that it will transmit a part of the light of ray $R'''$ therethrough as ray component $r_1$, and reflect another part as described. Mirror 33 is positioned above mirror 31 and in the path of the ray part 41, in a 45° plane with the horizontal, as shown best in FIG. 3c, such that it will reflect the light of the ray part 41 from the point 43 in a horizontal direction perpendicular to the ray $R'''$, as shown by arrow 45. The third mirror 35 is positioned in the path of ray part 45, in a vertical plane at 45° to the ray part 45, to reflect the light at point 47 at a right angle as the component ray $r_2$ having a direction substantially parallel to the component ray $r_1$, as shown best in FIGS. 3a and 3b. It can be seen from FIG. 3c that a horizontal shift of the reflected ray $R'''$ produces a vertical shift of the ray part 45, resulting in a corresponding vertical shift of component ray $r_2$, which is measured and recorded by the sensor 23 and recording device 27.

With the optical means 17 illustrated, the component ray $r_1$ will also have a horizontal component if the mirror 1 has any angular motion about a vertical axis. This horizontal component causes the component ray $r_1$ to sweep horizontally across the narrow faces of the mirror 21, which changes the instantaneous position of the reflected ray $r_1$ on the sensor "V" 25. The effect of this horizontal motion on the measured time intervals is minimized by making the time intervals short compared to the period of the horizontal motion. This is done by making the speed of rotation of the mirror 19 large compared to the frequency of the components of angular motions being measured. The same is true of the vertical component of the reflected primary ray $R'''$ associated with the component ray $r_2$ as an undesired horizontal component at the mirror 19.

In the gun barrel example disclosed, any recoil motion of the gun barrel 5 relative to the stationary mirrors 7 and 9 causes a very small horizontal shift of the ray $R''$ along mirror 9 (upward in FIG. 1) and a corresponding shift of the ray $R'''$ (to the right in FIG. 1) which causes a slight error in the measurement of this component of angular motion of the mirror 1. However, since the mirrors 7 and 9 are close together and the barrel 5 is very long, the angle between the rays $R''$ and $R'''$ is so small that this error can be neglected. Moreover, if desired, this error can be corrected by a small constant correction in the measurements.

Although no supports for the various mirrors and other elements are shown in the schematic drawings, it will be understood that the mirrors 7 and 9 and at least one of the mirrors 31, 33 and 35 should be angularly adjustable to suitably direct the light rays.

The foregoing disclosure and drawings are merely illustrative of the principles of this invention and are not to be interpreted in a limiting sense. I wish it to be understood that I do not desire to be limited to exact details of construction shown and described, because obvious modifications will occur to a person skilled in the art.

What is claimed is:

1. A system for measuring the components of angular motion of an object about two perpendicular axes, comprising:

a first mirror fixed to said object and containing said two axes;

means for projecting a collimated primary light ray onto said mirror, at the intersection of said axes, along a first path at a small angle with a perpendicular to said mirror at said intersection, said light ray being reflected from said mirror along a second path at an equal angle with said perpendicular, whereby angular motion of said mirror about said axes, due to angular motion of said object, causes the reflected ray to move transversely with components of motion in two planes perpendicular to each other and to said two axes;

optical means positioned in the path of said reflected ray for splitting that ray into two spaced substantially-parallel component rays having transverse components of motion in two spaced substantially-parallel planes corresponding respectively to the two components of motion of said reflected ray;

means including a second mirror for reflecting said two component rays in directions transverse to said planes; and a photosensitive sensor positioned in the path of each of said reflected component rays, each sensor comprising means responsive to the respective reflected component ray for measuring the transverse motion thereof.

2. The system of claim 1, wherein the direction of said reflected ray is changed substantially 90° by a third mirror positioned between said first mirror and said optical means, at substantially 45° to said first mirror.

3. The system of claim 2, wherein said light ray projecting means comprises:

a fourth mirror positioned along said first path at substantially 45° thereto; and a collimated light source positioned to project a light ray onto said fourth mirror at substantially 45° thereto, to be reflected along said first path to said first mirror.

4. The system of claim 3, wherein the distances from said first mirror to said third and fourth mirrors are large compared to the maximum distance between said first and second paths, whereby the effect of any linear movement of said object and mirror along said perpendicular on said measurements is minimized.

5. The system of claim 4, wherein:

said object is the muzzle end of a long gun barrel adapted to recoil relative to a gun mount on firing;

said first mirror is affixed to said muzzle end and oriented in a plane perpendicular to the bore axis of said barrel; and said third and fourth mirrors are positioned close to each other near the rear end of said barrel and affixed to a stationary part of the gun mount.

6. The system of claim 1, wherein said optical means comprises:

a partially-reflecting third mirror mounted in the path of said reflected ray in position to transmit a first portion of the light of said reflected ray therethrough to said second mirror as one of said component rays while reflecting a second portion of said reflected ray at substantially 90° to said one component ray and in the plane of transverse motion of said one component ray;

a fourth mirror positioned in a plane to reflect the reflected second portion in a direction substantially 90° to said plane of transverse motion of said one component ray; and a fifth mirror positioned in a plane to reflect the twice-reflected second portion in a direction substantially parallel to said one component ray, as the other component ray.

7. The system of claim 1, wherein:

said reflecting means includes means for said second mirror at substantially constant speed to scan said sensors with said reflected component rays; and each of said sensors is responsive to said scanning and said transverse motion of said component rays to measure said transverse motion.

8. The system of claim 7, wherein said speed is high compared to the angular motion being measured.

9. The system of claim 7, wherein each of said sensors comprises a V-shaped light sensitive element scanned by the component ray.

10. The system of claim 1, wherein said second mirror comprises at least one reflecting surface adapted to reflect both of said two component rays.

* * * * *